United States Patent [19]

Siau

[11] 4,410,914
[45] Oct. 18, 1983

[54] TELEVISION PICTURE STABILIZING SYSTEM

[75] Inventor: John E. Siau, Norwalk, Conn.

[73] Assignee: CBS Inc., New York, N.Y.

[21] Appl. No.: 344,342

[22] Filed: Feb. 1, 1982

[51] Int. Cl.³ .............................................. H04N 5/21
[52] U.S. Cl. .................................... 358/222; 358/126
[58] Field of Search ............... 358/105, 125, 126, 109, 358/222

[56] References Cited
U.S. PATENT DOCUMENTS 3,711,639  1/1973  Alpers ................................. 358/126

Primary Examiner—Joseph A. Orsino, Jr.
Attorney, Agent, or Firm—Spencer E. Olson

[57] ABSTRACT

The disclosed picture stabilizing system detects and measures television picture unsteadiness and automatically reduces such unsteadiness by selecting camera motion references within the picture consisting of an horizontal edge and a vertical edge of an object or objects which will normally be stationary, such as a door or a window, continually measuring the motion of the selected reference edges from field to field, and making the necessary vertical and horizontal corrections to the overall picture to substantailly eliminate picture motion due, for example, to unsteadiness of the television camera. The system employs vertical and horizontal tracking windows for respectively tracking the selected horizontal and vertical reference edges, and to simplify the task of maintaining the tracking windows in engagement with their respective reference edges in the presence of up and down and side-to-side movement of the reference edges, memory means are provided for initially separately storing the horizontal position of the vertical tracking window along the horizontal reference edge and the vertical position of the horizontal tracking window along the vertical reference edge which are respectively responsive to measured side-to-side motion and measured up and down motion to automatically alter the horizontal position of the vertical tracking window and the vertical position of the horizontal tracking window.

5 Claims, 3 Drawing Figures

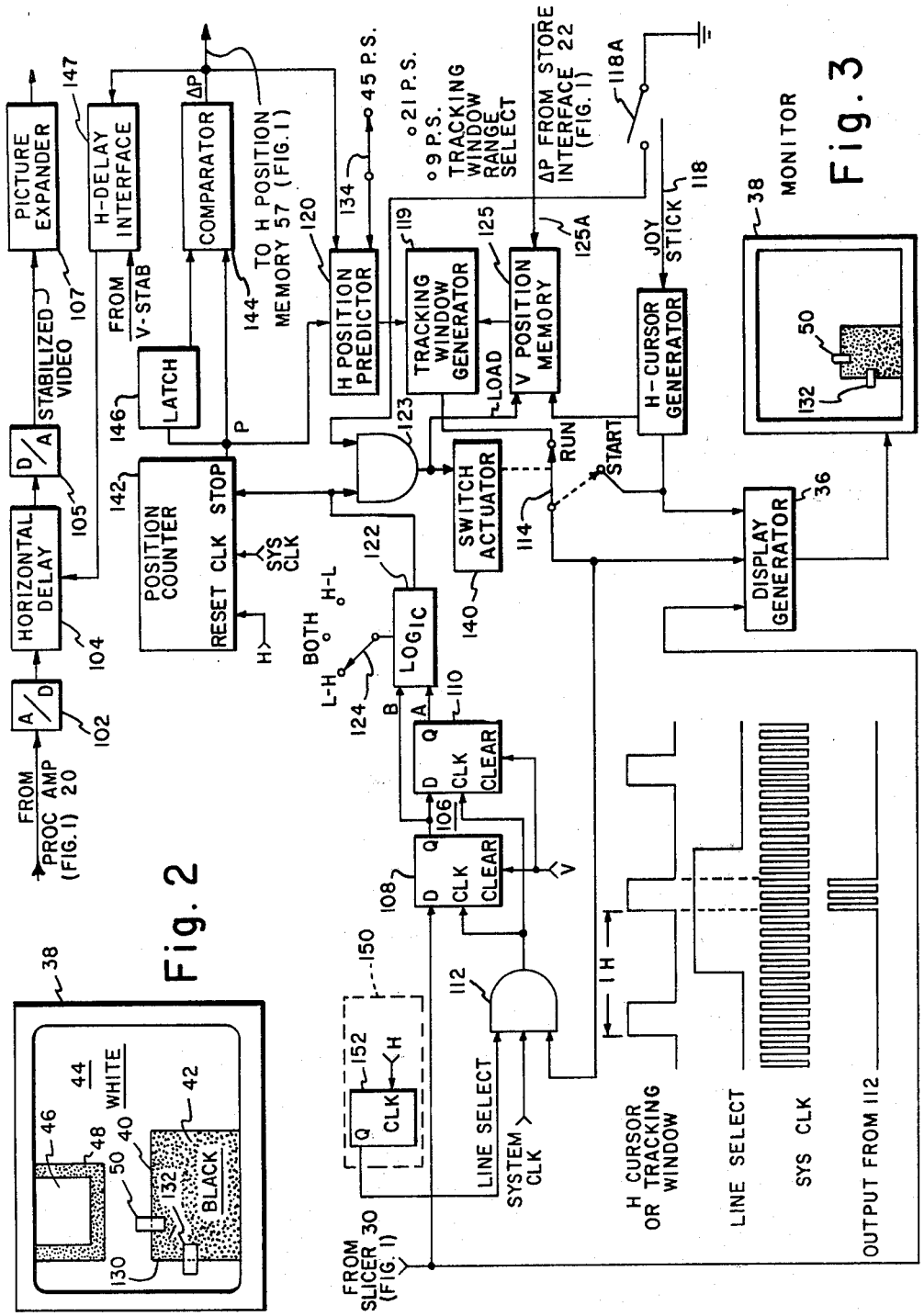

TELEVISION PICTURE STABILIZING SYSTEM

BACKGROUND OF THE INVENTION

This invention generally relates to video signal processing apparatus, and more particularly to a signal processing system for stabilizing a television picture reproduced from video produced by an unsteadily held camera.

Commonly assigned application Ser. No. 319,845 filed Nov. 10, 1981 by Richard R. Green, Henry W. Mahler and the present applicant, entitled "Television Picture Stabilizing System", the disclosure of which is hereby incorporated herein by reference, describes a signal processing system for detecting and measuring picture unsteadiness in recorded or live video, and automatically eliminating such unsteadiness without destroying the effects of intentional panning and tilting of the camera. A video signal from an unsteadily held camera is passed through a variable delay device having a controllable delay time which is adapted to introduce an off-setting delay equivalent in time but in a direction opposite to the motion that would otherwise be observed in the television picture as a consequence of camera motion. This is accomplished by selecting camera motion references within the camera field of view consisting of one generally horizontally disposed edge and one generally vertically disposed edge of an object which would normally be stationary, such as a door, a window, or a piece of furniture. The stabilizing system "locks" onto these edges, continually measuring their motion from frame to frame, and utilizing suitable delay devices makes the necessary vertical and horizontal corrections to the overall picture to substantially eliminate such motion. The system is able to separately track the moving edges while recognizing the important difference between random unsteadiness and planned camera movement.

Although the system of the copending application acceptably performs the function outlined above, the fact that each or both of the selected horizontal and vertical reference edges may in some situations move both horizontally and vertically makes it inconvenient at best and often difficult for the operator to keep the system "locked on" to the selected reference edges. The nature of the problem will be best understood by consideration of a specific example. Considering first a situation where simultaneous horizontal and vertical motion does not present a problem, imagine a scene in which a telephone pole extends beyond the top and bottom of the picture, an ideal reference for horizontal stabilization. In the system described in the copending application a joystick-controlled cursor is positioned over a portion of the pole to initialize the horizontal stabilization portion of the system, and once initialized the horizontal stabilizer "looks" for this reference edge once every field at a vertical position determined by the joystick and at a horizontal position centered at a point computed by adding its previous motion to its previous horizontal position. Thus, the operator is required to keep the vertical position of the joystick-controlled cursor at a position somewhere between the top and bottom of the vertical reference edge. If a telephone pole is available as the vertical reference there is no problem since the picture could move a large distance vertically, either up or down, before the cursor would have to be moved. However, most real world scenes do not present such convenient objects for use as references. Suppose, for example, that instead of a telephone pole the only object in the scene that might serve as a vertically disposed reference edge is a stop sign which may be only one-tenth or one-twentieth of the total picture height. As in the case of the telephone pole, the operator can position the cursor on the sign post and use it for horizontal stabilizaton. However, if the picture moves up or down by any substantial amount, the operator is presented with the difficult task of maintaining the cursor between the top and bottom extremities of the signpost. The shorter the reference object is relative to the overall height of the picture, the more precise is the requirement for vertical positioning of the cursor on the vertical reference edge. To simplify the operator's task in situations of the type described, and in situations where the scene is complex and offers only short reference edges, the system desirably should be capable of automatically moving the horizontal reference selection cursor vertically and in the same direction as the picture is moving, and of also moving the vertical reference selection cursor horizontally in the same direction and by the amount the picture is moving horizontally.

OBJECTS AND SUMMARY OF THE INVENTION

The primary object of the present invention, therefore, is to provide an improved picture stabilizing system and, more particularly, to increase the versatility while simplifying the operation of the picture stabilizer described in the aforementioned copending application.

Briefly, this object is achieved by applying the vertical motion detected by the vertical stabilizer portion of the system to the horizontal stabilizer reference selection tracking window during the next following field, and horizontal motion detected by the horizontal stabilizer is applied to the tracking window of the vertical stabilizer during the following field. This is accomplished with a pair of memory units, one for the vertical stabilizer and one for the horizontal stabilizer, which respectively store the horizontal position of the vertical stabilizer reference and the vertical position of the horizontal stabilizer reference. Both memory units are initialized to store the position of their respective joystick-controlled cursors, and these stored positions are then updated in accordance with the detected motion and used to control the positions of the reference tracking windows. Thus, once the operator has selected a horizontal reference and a vertical reference by positioning joystick-controlled cursors over the desired edges, the automatic tracking mechanism takes over, leaving the operator free to move the cursors elsewhere in the scene in preparation for the selection of new reference edges as may be required by scene changes.

The above, and other objects, features and advantages of the invention will become apparent, and its construction and operation better understood, from the following description read in conjunction with the accompanying drawings.

BRIEF DESCRIPTION OF THE DRAWINGS

FIG. 2 is an illustration of a display on a television monitor useful in describing the operation of the system of FIG. 1; and FIG. 3 is a block diagram of the horizontal stabilizer portion of a video processing system in which the invention is embodied.

DETAILED DESCRIPTION OF THE PREFERRED EMBODIMENT

Figure 1:
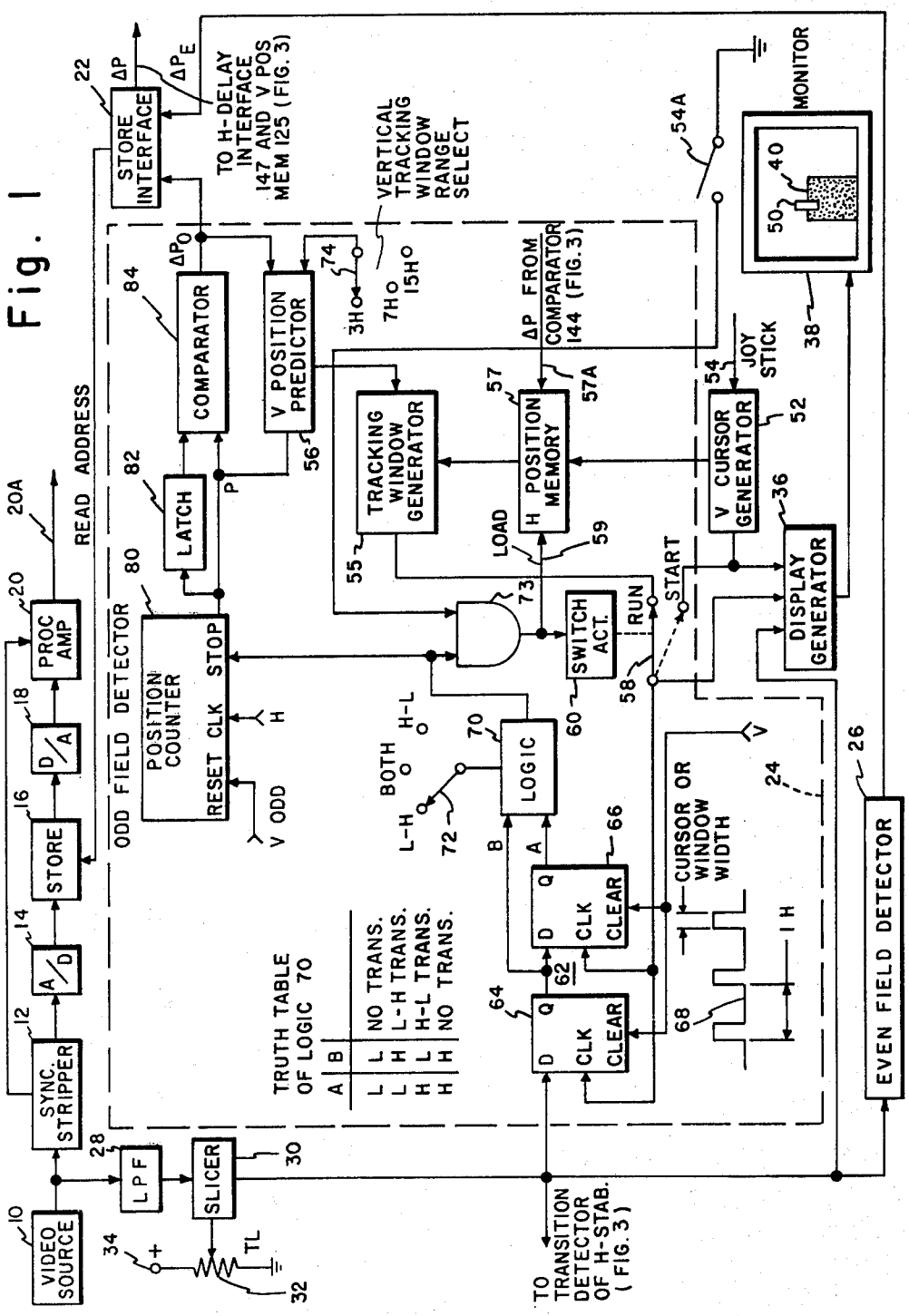
FIG. 1 is a block diagram of the vertical stabilizer portion of a video processing system in which the present invention is embodied.

Although the improved picture stabilizing system embodying the invention is useful in any of the currently used television systems, the system will be described as applied to the NTSC color television system. Further, although the system may be implemented in either the analog or the digital domain, the digital implementation is preferred because of its superior accuracy and ease of construction and will be described. Also, since the invention resides in a modification of the picture stabilizing system described in copending application Ser. No. 319,845, the description thereof will here be repeated to the extent necessary for an understanding of the present invention without recourse to the copending application.

Referring first to the vertical picture stabilizer illustrated in FIG. 1, a video input signal from a video source 10 which, for example, may be a video tape recorder for reproducing a video signal produced by an unsteadily held portable television camera, is applied to a sync stripper 12 which removes the sync pulses and the resulting non-composite video signal is encoded by a pulse code modulation (PCM) technique, such as described in U.S. Pat. No. 3,946,432 utilizing an 8-bit code, in an analog to digital converter 14 and then applied to and propagated through a digital storage or delay means 16. The delay circuit may take the form of the now well-known digital frame store and preferably has a storage capacity of 525 television lines, or one NTSC frame. The digital non-composite video emerging from the frame store, normally delayed by up to 525 H, is converted to analog form by a digital-to-analog converter 18 and applied to a conventional processing amplifier 20 which reinserts the sync and produces a composite video signal at its output terminal 20a. The A/D and D/A converters may be incorporated in store 16, and normally are in currently available digital frame stores. It is possible to control currently available frame stores so as to delay an applied video signal by an arbitrary amount from zero up to 525 H in units of system clock intervals, typically, about 70 nanoseconds. The delay time is altered by advancing or retarding the read address of the store under control of a suitable store interface 22, and the amount by which the uncorrected video signal must be delayed to stabilize an unsteady picture caused by camera instabilities is detected and measured by the signal processing system now to be described.

The description will initially be confined to vertical picture stabilization (i.e., removal of up and down motion in the television picture) which, as has been noted, is accomplished by delaying or advancing the uncorrected video by an integral number of horizontal lines. The presence and magnitude of vertical motion is detected by observing the location of a reference horizontal edge and comparing it with its location one frame (1/30 sec.) earlier; i.e., in the next previous corresponding odd or even field. Direct comparison with the previous field cannot be made because of the interlaced nature of the NTSC (PAL and SECAM, also) system; either the odd fields, or the even fields, or both may be utilized. In the description to follow, odd fields will be used for comparison, with the understanding that the operation would be the same if the even fields were utilized instead. An alternative approach utilizing both the odd and the even fields will also be discussed.

The control system derives from the incoming video signal a reference signal representative of a normally stationary horizontal edge in the television picture, the vertical position of which will change with up and down motion of the picture and thus provide a reference for measuring the amount of correction needed to maintain the horizontal edge, and hence the picture itself, at substantially the same vertical position. The reference signal is conveniently derived from only the luminance component of the input video signal and to this end the chrominance component of the video signal is removed by a low pass filter 28, and only the luminance component applied to a video slicer 30, which is also supplied with an adjustable threshold slice level TL by a potentiometer 32 connected between a source of positive potential, represented by terminal 34, and ground. The slicer circuit, which may take any of many known forms, delivers a binary output which is high when the video signal exceeds the threshold level. The threshold level is selected so that an abrupt change in the video, say from black to white, or from white to black, as might be encountered at an edge exhibiting a contrast with the background, is highly intensified by producing a 2-level signal at the output: if the amplitude of the video happens to be below the threshold level the output voltage will have one level, and if the video exceeds the threshold the output signal will have the other voltage level. When the sliced video, after reinsertion by a suitable display generator 36 of the sync and burst removed by the slicer, is displayed on a picture monitor 38, the result is a black and white signal display with no grey; all luminance below a certain threshold level is black, and all luminance above the threshold is white, or vice versa, depending on the polarity of the slicer output signals and whether or not they are inverted before being applied to the monitor.

Although the entire video signal is sliced, operation of the system depends only on such object or objects in the scene which will serve as a suitable reference, which for vertical stabilization would be a horizontal line or edge of an object that would normally be stationary. In the example illustrated in FIG. 2, the top edge 40 of a dark door 42 against a bright wall 44 would provide an excellent reference for measurement of up and down motion of the picture in which it is contained. The example chosen for illustration also includes a window 46 the frame of which appears black in the display and presents both horizontal and vertical edges; the lower edge 48 of the window frame could therefore be used as an alternate reference edge for measurement of up and down picture motion.

The horizontal edge in the scene chosen as the reference for measuring up and down motion of the picture is electronically selected by a cursor 50 which is generated by a vertical cursor generator 52 and under control of display generator 36 is displayed on the monitor as a rectangle having greater illumination intensity, or a different color, than that of the displayed sliced video. The left hand vertical edge of cursor 50 defines a vertical line along which the detector looks for a horizontal edge, its horizontal width being unimportant other than that some finite width is required to enable the operator to see it. In the preferred embodiment, cursor 50 is displayed in color and, therefore, must be at least several cycles of the color subcarrier in width.

The position of the cursor 50 on the display is electronically manipulated up and down and from left to right by a joystick control of conventional design, schematically shown at 54; by properly manipulating joystick 54, which is operatively associated with cursor generator 52 and display generator 36, the operator can position the cursor at any desired location on the display. The illustrated example assumes that the cursor has been positioned to straddle the horizontal edge 40 so as to "look at" the point of intersection of the left hand edge of cursor 50 with the horizontal edge 40 and thus specify such point on edge 40 as the picture-contained reference for measurement of up and down picture motion.

Omitting for the present a description of the position predictor 56, when a switch 58 (schematically shown as a mechanical switch but actually an electronic switch) is in its "START" position, cursor 50 is applied as one input to a transition detector 62 consisting essentially of two positive-edge-triggered "D"-type flip-flops 64 and 66 cascade-connected as shown. A characteristic of the "D"-type flip-flop is that there is a finite delay, following application of a clock pulse, before information present at its D input is passed to its Q output; this feature is used to advantage in the transition detector. The output of video slicer 30, which is high whenever the video exceeds the threshold level TL, is applied to the D input of flip-flop 64, and its Q output is applied to the D input of flip-flop 66. Vertical sync pulses derived, for example, from sync stripper 12, are applied simultaneously to the "CLEAR" input of each of the flip-flops for resetting transition detector 62 at the beginning of each field of incoming video.

The V-cursor is produced by a digital waveform 68 which is high whenever a portion of the video covered by the cursor is being scanned; it is a sequence of pulses which occur once every field and adjacent pulses of which are separated by exactly 1 H. This waveform is applied to display generator and displayed as a vertically disposed rectangle on monitor 38, and is also applied to the clock input of each of flip-flops 64 and 66, each of which is operative to pass, after some delay, information present at its "D" input to its Q output whenever a positive-going edge occurs at its clock input, and the Q output will remain at the level (either high or low) until the next positive edge occurs at the clock input. Thus, if the first pulse in the sequence occurs at time T, then just after time T the Q output of flip-flop 64 will equal the output of slicer 30 at time T, and will remain unchanged until just following time$=T+1$ H, at which time flip-flop 66 looks at its "D" input; therefore, just after time$=T+1$ H the Q output of flip-flop 66 is equal to the output of slicer 30 at time$=T$. In the meantime, flip-flop 64 will have passed its "D" input to its Q output just after time$=T+1$ H. The inherent delay of the flip-flops permits comparison of output A from flip-flop 66 with the output B from flip-flop 64 in a suitable logic circuit 70 to provide an indication of whether or not a vertical transition (i.e., from black to white, or white to black) has occurred. As seen from the truth table of logic 70, when output A of flip-flop 66 is equal to output B of flip-flop 64 (i.e., both are low, or both are high) no transition has occurred. On the other hand, it is known that a transition has occurred when outputs A and B are unequal, and the logic also determines whether the transition was from low-to-high or from high-to-low, and by means of a switch 72 the operator can select either the L-H transition or the H-L transition, or both, for sensing and measuring the position of the reference transition; e.g., the edge 40 of the door 42 (FIG. 2). The high output of logic 70 when a reference transition is found is applied as one input to an AND gate 73 which, when a high is simultaneously applied to its second input (from a source to be described), produces an output signal which activates the switch actuator 60, which in turn, throws switch 58 from its "START" to "RUN" position; when the switch is in the latter position, transition detector 62 looks for a reference transition within a region defined by a vertical tracking window produced by a tracking window generator 55 and position predictor 56, the operation of which will be described presently. Suffice it to say for now that the waveform of the vertical tracking window is identical to waveform 68 of the vertical cursor except that it has fewer pulses per field; typically, it consists of either three, seven or fifteen pulses per field, selectable by the operator by actuation of a switch 74, corresponding to a vertical tracking window height of three, seven or fifteen television lines. The significance of this selectability, and the function of the position predictor and the tracking window, will be evident from a later description thereof following discussion of how the vertical position of the reference edge in the television picture is measured.

The output signal from logic 70 is also applied to the "STOP" terminal of a position counter 80; since the position of any point in the picture is a function of time, the vertical position of the selected horizontal reference is determined by counting down from the first scan line in a field (in this case, an odd field) until the line containing the reference transition is reached. To this end, the counter is reset by odd frame sync pulses derived from the incoming video signal, for example, by sync stripper 12, and applied to the "RESET" terminal of counter 80, and horizontal sync pulses H, also derived from the incoming video, are applied to the "CLOCK" input of the counter. The counter counts scan lines of the field until stopped by a signal from logic 70, signifying that the vertical position of the horizontal reference has been reached, whereupon the count stops and the counter produces at an output terminal a digital number representative of the scan line containing the reference edge.

This number is supplied to and stored for a period of one television frame in a suitable latch circuit 82 so as to be available for comparison with the number of the line which contains the reference edge in the next-occurring odd field. The number stored in latch circuit 82 is outputted at the frame rate and applied as one input to a comparator 84, the second input of which is the output of counter 80; thus, comparator 84 compares the position of the reference edge in the current odd field (that is, the number directly applied to the comparator from counter 80) with its position in the next previous odd field, as represented by the number stored in the latch circuit, and produces an output, $\Delta P$, representative of the direction and amount of motion of the reference edge during the period between successive odd fields. This signal is applied to suitable interface circuitry 22, the function of which is to control the delay of store 16 by advancing or retarding its read address. In the event of upward tiltings of the camera, the interface circuitry advances the read address by the proper number of horizontal line so as to cause the reference edge to appear in the same scan line of the current field as it occupied in the immediately preceding odd field, and if there is continued camera motion in the same direction, the system continues to advance the read address to "keep up" with the motion until such time as there is no change in the position of the reference edge in two successive odd fields; that is, there is no output from comparator 84, or the maximum limit of the correction range has been reached with the consequence that no further change is made to the read address of the frame store. If the count of ΔP should reverse, indicating that the reference edge is moving upward instead of downward, the store interface 22 would retard the read address to move the entire picture down to where it was in the immediately preceding odd field.

How and when horizontal lines are added or substracted to effect vertical stabilization is described in detail in the aforementioned copending application and will not be repeated here; suffice it to say that the correction is applied during the vertical blanking period (when there is no picture) at which time the measured change in position of the reference edge is applied to the video in the frame store by changing the delay introduced by the frame store.

The description thus far has assumed the use of only one vertical motion detector which compares either successive odd fields or successive even fields, but not both, to detect vertical motion, and the point has been made that the interlaced scan of commercial television systems precludes comparison between immediate successive fields. It is recognized, however, that certain industrial and military television standards which do not employ interlace would be amenable to successive field comparisons. Provision of a second detector for sensing vertical shifts in the fields not compared by the first detector which, in the description thus far has been considered an odd field detector, would significantly improve the operation of the system. More particularly, the use of a second, even field detector 26 enables more precise corrections to be performed upon slowly changing vertical motion by detecting motion that might occur during the half-frame interval between successive odd fields. This doesn't mean that the odd field hasn't also moved; it merely means that it has not moved sufficiently for the detector to measure a 1 H change in position. The sliced video from slicer 30 is applied to even field detector 26, and if the transition detector 62 is incorporated in the slicer it could serve both the odd and even field detectors, and logic circuit 70 and switch actuator 60 likewise could be shared by the two detectors. However, the even field detector must have its own latch and comparator in order separately to detect and measure motion of the horizontal reference edge by repetitive comparison of the current even field with the even field immediately preceding it.

Keeping in mind that correction for horizontal camera motion will be applied concurrently with application of vertical correction, but still deferring description of how the amount of horizontal correction is measured and applied, it will be evident that as television lines are added or substracted to effect vertical stabilization, and small increments are added or subtracted to effect horizontal stabilization, the resulting encroachment of the blanking region into the reproduced picture will become visible, which places a practical limit on the range of correction that can be achieved. In order that blanking not be seen in the reproduced picture, means are provided for "cropping" that portion of the blanking region seen in the picture; this can be accomplished by expanding the active picture, subsequent to application of the correction, by means now well-known in the industry as "electronic zoom", to an arbitrary extent, both horizontally and vertically, such that the home viewer will not see the blanking which the correction has introduced into the larger picture. This requirement for "cropping" imposes an upper limit on the extent to which correction can be applied, because the more the correction the more the picture must be cropped, and at some point the picture becomes unacceptable. As a practical matter it has been found that no more than sixteen television lines should be cropped from the height of the picture and, by analogy, no more than a comparable amount from the width of the picture. This means that it is possible to apply ±8 television lines of correction in order to achieve vertical stabilization and yet have an acceptable picture.

The just described correction range that is, ±8 television lines for vertical stabilization, is not to be confused with the height of the tracking window (also measured by numbers of H) employed to determine the size of the active region selected for following the reference edge for detection and measurement of vertical motion. In a typical situation, the tracking window "looks" at fewer horizontal lines than the system is capable of correcting for; if the vertical tracking window is too high, then other information present within the scene could intrude into the tracking window and frustrate the operation of the system. In the example illustrated in FIG. 2, if the tracking window were appreciably higher than the assumed three horizontal lines, the lower horizontal edge 48 of the picture frame might intrude into the tracking window and confuse the system as to which edge it has selected for vertical picture stabilization. As has been noted, transition detector 62 has intelligence to the extent that it can distinguish between a low-to-high and high-to-low transition in the sliced video, and switch 72 gives the operator the option of selecting either or both, and seizes upon the first horizontal reference edge it finds. However, as has been noted, joystick 54 enables the operator to shift the position of the cursor to enable selection of a particular horizontal reference edge. As will be described presently, if the height of the tracking window is limited to a reasonable number of lines it locks onto and automatically follows the selected edge in spite of vertical motion of that edge.

Before proceeding to a description of position predictor 56, it will be useful to review the functions of the cursor and the tracking window, and how the position predictor and the present invention affect the tracking window; although the horizontal stabilizer (to be described) also employs a cursor, a tracking window and a predictor, because its operation is closely analogous the present description will be limited primarily to the vertical stabilizer. During startup of vertical stabilization, that is, at any time when a reference edge is being selected by joystick manipulation by the operator, the system "looks" for a reference in the region determined by the left vertical edge of the cursor.

When the cursor intersects the selected reference edge, transition detector 62 manifests its detection thereof by logic 70 producing and applying a voltage high to one input of AND gate 73, and the operator, visually observing the intersection of cursor 50 and reference edge 40 on monitor 33, then actuates a switch 54a, which may be carried on or built into joystick 54, which is operative to apply a voltage high to the second input of AND gate 73. Simultaneous voltage highs at the inputs to gate 73 causes switch actuator 60 to move switch 58 to the "RUN" position and the stabilizer thereafter "looks" for the selected reference edge within the region defined by the tracking window from generator 55. The tracking window moves with or vertically tracks the motion of the reference edge and is a "window" through which the stabilizer looks for the reference edge. Whereas in the system of the copending application the position of the left hand edge of the tracking window corresponds to the position the left edge of the cursor was in at the time of transition from the "START" to the "RUN" mode, and is locked in that position, according to the present invention, the position of the left edge of the cursor at the time of transition from "START" to "RUN" is stored in a horizontal position memory 57, the loading of which is initiated by a signal from the output of gate 73 applied over line 59 which, it will be recalled, occurs when the operator actuates switch 54a simultaneously with logic 70 applying a high to the gate. Memory 57 preferably takes the form of a digital counter which can be incremented and decremented by pulses applied to an input terminal 57a, and the position information is in the form of a digital number; there being about 1000 possible horizontal positions at which the left edge of the tracking window might be initially located, its precise position is represented by a finite digital number between zero and approximately 1000. Counter 57 is incremented or decremented by pulses applied to terminal 57a from a horizontal stabilizer (to be described with reference to FIG. 3) representative of side-to-side movement of the picture caused by camera unsteadiness; it counts up in response to horizontal motion of the picture to the right and this new number applied to tracking window generator 55 moves the tracking window to the right, and, conversely, it counts down and causes the tracking window to move to the left when the horizontal stabilizer detects right-to-left picture movement. Thus, the horizontal position of the tracking window used for vertical stabilization automatically follows side-to-side movement of the picture. The vertical position of the tracking window along this horizontally movable edge is established by the predictor 56, which provides a range along this vertical edge over which the reference edge is looked for. Thus, the vertical stabilizer looks for a horizontally oriented reference along a vertical line segment. The principal function of the predictor is automatically to position the tracking window such that the line segment is centered over the expected or predicted position of the reference edge, such centering occurring along the left vertical edge of the tracking window. The predictor decides where to center the tracking window by adding the previous position of the reference to its previous change in position; i.e., by looking at where the reference edge was last seen and how much and in which direction it was moving, the predictor determines where it can be expected to be "seen" in the next frame. To provide some margin for error in the event of a change in the velocity of movement of the reference edge from what it was at last look, the line segments must have sufficient length to accommodate such velocity changes; however, they should not be longer than necessary for this purpose since the longer they are the greater is the chance that some other horizontal edge in the picture might intrude into the tracking window and be confused with the reference edge. The optimum tradeoff depends largely on the program material being stabilized, which is the reason the switch 74 is provided to permit the operator to select the length, either three, seven or fifteen horizontal lines in the present embodiment. If the unsteadiness of the scene is relatively minor, short tracking windows (e.g., 3 H high) may be used if necessary to prevent interference from other edges in the picture.

The position predictor, described in detail in the copending application, has three inputs: (1) a signal indicative of the height of the active region of the tracking window, namely, 3 H, 7 H or 15 H; (2) a signal ΔP from the output of comparator 84 indicative of the change in position of the selected reference edge between the two previous successive odd (or even) fields; and (3) a signal P from the output of position counter 80. The predictor uses this information to adjust the vertical position of the tracking window, this being the only portion of the picture in which the transition detector is enabled.

Operation of the predictor is based on the assumption that the camera motion, and thus the motion of the reference horizontal edge, is in the same direction over a period of several frames and that the magnitude or extent of motion changes gradually. Reversals in the direction of up and down motion, or changes in the degree of such motion are accommodated by the height of the tracking window, and as will be seen presently, changes in direction of side-to-side camera motion, and changes in the degree of such motion are accommodated by the size of a similar tracking window embodied in the horizontal stabilizer. An important feature of the system is that after startup the tracking window continues to follow (i.e, locks onto) a selected horizontal reference edge even if the edge moves from side-to-side.

Turning now to the horizontal stabilizer illustrated in FIG. 3, although the foregoing description of the vertical stabilizer implies that the horizontal stabilizer is similar in implementation and operation, there are major differences, the most significant of which stems from the fact that the vertical stabilizer operates responsively to integral line differences; that is, shifting of the picture is done on the basis of an integral number of horizontal lines. Using composite coding of the video, the color subcarrier contained in the video does not pose significant problems in the vertical stabilizer in that shifting of the picture by an integral number of lines causes the color subcarrier to be in a known one of two phases, either the so-called 0° phase or the 180° phase, and a chrominance inverter conventionally built into frame store 16 provides the necessary correction to ensure that the color subcarrier always has the correct phase as it leaves the frame store. In the horizontal stabilizer, however, in which the delay device introduces delays of only a few microseconds duration, the amount of which is varied in terms of system clock periods, the presence of the color subcarrier creates troublesome problems. In practice the delay unit is set to establish a nominal delay for the video passing through it and the amount of delay is adjusted relative to the intermediate delay in terms of clock units, which in the case of sampling at four times the color subcarrier frequency is approximately 70 nanoseconds each, to compensate for the measured horizontal shift of the picture caused by camera unsteadiness. The exact nature of the problem and how it is solved is described in detail in the aforementioned copending application.

In a successfully operated embodiment of the system, the output from the vertical stabilizer (FIG. 1), that is, the analog composite video signal from PROC AMP 20, is digitally encoded in an analog to digital converter 102 and applied to the input of a horizontal delay device 104; thus, the horizontal stabilizer applies horizontal correction to a video signal that has already been vertically stabilized. Although application of horizontal stabilization in this way is not essential to the operation of this system, it has been found to be operationally acceptable and, in general, more easily implemented than other approaches that might be used. However, as in the vertical stabilizer, a signal for controlling the delay of delay device 104 is derived from the input video signal because horizontal stabilization depends on a vertically disposed edge in the scene, the horizontal position of which will change with side-to-side motion of the picture and thus provide a reference for determining the amount of correction needed to maintain the vertically disposed edge, and hence the total picture, at substantially the same horizontal position.

The reference signal for horizontal stabilization may be and preferably is derived from the sliced video from slicer 30 (FIG. 1), which is applied to a transition selector 106 which, as in the vertical stabilizer, consists of a pair of cascade-connected "D"-type flip-flops 108 and 110, with the Q output of the former applied to the D input of the latter, and the sliced video applied to the D input of flip-flop 108. The flip-flops are both reset at the beginning of each field by vertical sync pulses applied to their respective "CLEAR" inputs. Here the similarity with the vertical transition detector ends; the clock inputs to the flip-flops, instead of being a sequence of pulses separated by 1 H and spanning several lines, is a sequence of pulses separated by a period of time equal to one cycle of the 14 MHz system clock, all of which span a portion of only one horizontal television line. This pulse sequence is generated by a 3-input AND gate 112, the output of which goes high only when all three inputs go high. Depending on the position of a switch shown schematically at 114, one of the inputs is either a horizontal cursor from a horizontal cursor generator 116 having a joy stick 118 for manipulating the position of the cursor on the display, or a horizontal tracking window from a tracking window generator 119; both consist of a sequence of pulses separated by 1 H and in which the number of pulses is equal to the height of the cursor or the height of the tracking window, as the case may be. A second input to the AND gate is a "line select" input, which is high for a period of 1 H, for selecting just one of the pulses from the cursor or tracking window sequence; i.e., for selecting just one television line on which detector 106 is to be enabled. The "line select" input is produced by a line select generator 150 consisting of a flip-flop 152 clocked by H, which produces an output which is high for every even-numbered line and low for every odd-numbered line, thereby to choose the line within the tracking window having the correct color phase relationship on which the detector will be active, while the horizontal cursor or horizontal tracking window (whichever is operative) selects at what point along this selected TV line the detector will be active. At this portion of the line where both of the described inputs are high, the output of AND gate 112 will be high whenever the third input, the 14 MHz system clock, is high, and will be low when the system clock is low. The period of one sample of this clock being equal to the sampling period of A/D converter 102, is also equal in time to the smallest incremental change in horizontal delay the delay device 104 is able to provide toward effecting horizontal stabilization.

It was seen from the description of the vertical stabilizer that the flip-flops could in that case store the output of slicer 30 at two different points in time separated by the period of clock inputs to the flip-flops. Flip-flops 108 and 110 perform a similar function in the horizontal stabilizer, and since the clocks are one cycle of the 14 MHz clock apart, detector 106 detects transitions between adjacent picture samples in the sliced video, rather than between the same points on adjacent picture lines as was the case in the vertical stabilizer. Thus, the Q output of flip-flop 110, labelled A, is the slicer output at time=T, and the output B of flip-flop 108 is the slicer output at time=T+1 clock cycle. This permits a comparison to be made between A and B to ascertain whether a horizontal transition has occurred; using a logic circuit 122 having the truth table shown in FIG. 1, and ignoring the effect of operation of a selector switch 124, a "true" output is produced only when A is low and B is high, or when A is high and B is low. Switch 124 permits the operator to select between the L-H and H-L transitions, or to use both, the choice being determined by the nature of the vertical reference edge available in the scene. In the example shown in FIG. 2, the left-hand edge 130 of the dark door 42 against the bright wall 44 would provide a good reference for measurement of side-to-side motion of the picture in which it is contained. This edge is an example of high-to-low transition (i.e., from white to black) and the opposite edge of the door is an example of a low-to-high transition.

During start up, with switch 114 in its "START" position, the vertically disposed edge in the scene chosen to be the reference is electronically selected by positioning the cursor over the chosen edge. Under control of display generator 36 the cursor appears on monitor 38 as a horizontally disposed narrow rectangle 132 having greater illumination intensity, or preferably a different color, than that of the black and white sliced video, and as in the case of the vertical stabilizer can be moved to any desired position on the display by manipulation of joystick 118. In the FIG. 2 example the cursor has been positioned to straddle the vertical edge 130 so as to "look at" the points of intersection of the vertical edge with selected horizontal lines in the raster so as to specify such points on edge 130 as the picture contained reference for measurement of side-to-side motion.

When detector 106 has detected the transition selected by the operator-positioned cursor, logic 122 produces a "true" output which is applied as an input to an AND gate 123 which, when an operator-initiated high is simultaneously applied to its second input, produces an output signal which activates switch actuator 140 which, in turn, throws switch 114 from its "START" to its "RUN" position, thereby to cause the pulse sequence representing the horizontal tracking window to be applied to AND gate 112. This pulse sequence is also applied to display generator 36 which causes the window to appear on monitor 38 as a horizontally disposed rectangle. The voltage high produced by logic 122 is also applied to the "STOP" input of a position counter 142, the function of which is to continuously determine, at field rate, the horizontal position of the selected vertically disposed reference edge. The counter is started at the beginning of each television line in response to horizontal sync pulses derived, for example, from sync stripper 12 (FIG. 1) and applied to the "RESET" terminal, and is clocked by the system clock which, as has been noted, typically is a train of pulses spaced by about 70 nanoseconds. The counter continues to count until the vertical reference edge is encountered, whereupon a "true" signal from logic 122 applied to the "STOP" terminal stops the counter. When the counter is stopped it produces at its output terminal a number representative of the current position of the vertical reference line; i.e., the number of system clock intervals from the left-hand end of the selected horizontal line. This number is compared in a comparator 144 with the number stored in a latch 146 representing the position of the vertical edge one field earlier and produces an output, designated ΔP, which represents the amount and direction of shift, if any, in the horizontal position of the vertical reference line that has taken place since the preceding field. This signal is applied to an H-delay interface 147 and adjusts the delay of delay device 104 relative to the aforementioned nominal delay to compensate for the measured horizontal shift of the reference edge, and is also applied to terminal 57a of the H position memory 57 (FIG. 1) for causing the memory to count up and down in response to side-to-side motion of the picture. As in the case of vertical stabilization, there is a practical limit to the number of picture samples by which the picture can be shifted, either right or left, without running into unacceptable "cropping" of the displayed picture. Recalling that ±8 television lines, or ±16 frame lines (which represents 6.6% of total active picture height) is a practical limit for vertical stabilization, if horizontal stabilization is correspondingly limited to 6.6% of the active picture width the correction range is approximately ±26 system clock intervals or approximately 3.6 microseconds. The vertically and horizontally stabilized signal produced at the output of delay device 104, which may be cropped by as much as about 6.6% of the active picture height and width, is converted to analog form by a digital to analog converter 105 and then, if desired, is applied to a picture expander 107, such as the known "electronic zoom" system, for expanding the video signal so as to produce a picture of normal full height and width.

The function of position predictor 120 is analogous to that of the position predictor in the vertical stabilizer, namely, to automatically position the horizontal tracking window such that its active region is centered over the expected or predicted position of the vertically disposed reference edge, such centering occurring orthogonally to the axis of the tracking window. In accordance with the present invention, the vertical position of the axis of cursor 132 at the time of the transition from "START" to "RUN" is stored in a vertical position memory 125, the loading of which is initiated by the output signal from AND gate 123, which occurs when the operator actuates a switch 118a, preferably carried on joystick 119, to apply a voltage high to an input of gate 123 coincident with application thereto of a voltage high from logic 122. Memory 125 may also take the form of a counter which can be incremented and decremented by pulses applied to a control terminal 125a derived from store interface 22 (FIG. 1) of the vertical stabilizer. The memory is initially loaded with a digital number representing the position at which the horizontal cursor is at the time of the transition from "START" to "RUN"; this number is stored in the memory and will be incremented or decremented by a vertical correction signal ΔP from the vertical stabilizer in a manner to cause the vertical axis of the tracking window to automatically follow up and down motion of the picture. The predictor decides where to horizontally center the tracking window by looking at where the reference edge was last seen and how much and in which direction it was moving, and predicting where it can be expected to be "seen" in the next field. To provide a margin for error in the event of a change in velocity of movement of the reference edge from what it was at last look, the active region must have sufficient length to accommodate to such velocity changes; however, it should not be longer than necessary for this purpose since the longer it is the greater the chance that some other vertical edge in the picture might intrude into the horizontal tracking window and be confused with the selected reference edge. Thus, provision is made for the operator to select, by operation of switch 134, a tracking range of either nine, twenty-one, or forty-five picture samples. The predictor, described in detail in the copending application, has three inputs: (1) a signal indicative of the width of the active region of the tracking window, namely, nine, twenty-one or forty-five picture samples; (2) a signal ΔP from the output of comparator 144 indicative of the change in position of the selected vertical edge between the two previous successive fields; and (3) a signal from the output of position counter 142. The predictor "looks at" the detected motion between these two previous successive fields and utilizes this information to adjust the position of the center of the horizontal tracking window, this being the only portion of the picture in which transition detector 106 is enabled. As in the case of the vertical stabilizer, operation of position predictor 120 assumes that camera motion, and thus the motion of the reference vertical edge, is in the same direction over a period of several frames and that changes in motion are gradual. Reversals in the direction of side-to-side motion, or changes in velocity of such motion, are accommodated by the width of the horizontal tracking window.

It will have been seen from the foregoing that the signal processing system of the invention detects and measures picture unsteadiness in recorded or live video and in the displayed picture by separately measuring up and down and side-to-side motion, and applying the necessary vertical and horizontal corrections to the overall picture to substantially elminate such unsteadiness in the picture. The improvement according to the invention simplifies the operator's task by separately storing initial positions of selected horizontal and vertical reference edges and updating these stored positions in accordance with detected picture motion to correspondingly and automatically control the positions of the tracking windows in directions to keep them engaged with their respective selected reference edges in spite of significant picture movement.

I claim:

1. An improved system for processing and producing from an input video signal exhibiting unsteadiness due to having been produced by an unsteady television camera, a corrected video signal essentially free from such unsteadiness, comprising means receiving said input video signal and for selecting therefrom a horizontally disposed reference edge and a vertically disposed reference edge within the camera field of view against which to measure up and down and side-to-side motion, respectively; means including first and second generators for respectively producing first and second tracking windows for respectively tracking the horizontally and vertically disposed reference edges for separately measuring motion of said horizontally and vertically disposed reference edges and producing vertical and horizontal correction signals, respectively; and means operative responsively to said correction signals for making the necessary corrections to the overall television picture represented by the said input video signal to reduce picture unsteadiness; the improvement comprising:

first memory means operatively associated with said first generator for storing information representing an initial position of said first tracking window horizontally along said horizontally disposed reference edge and responsively to said horizontal correction signals altering the horizontal position of said first tracking window to follow side-to-side motion of said horizontally disposed reference edge; and second memory means operatively associated with said second generator for storing information representing an initial position of said second tracking window vertically along said vertically disposed reference edge and responsively to said vertical correction signals altering the vertical position of said second tracking window to follow up and down motion of said vertically disposed reference edge.

2. System according to claim 1, wherein said system further includes separate operator-controllable means for initializing the storage in said first and second memory means of information representing said initial positions of said horizontally and vertically disposed reference edges, respectively.

3. System according to claim 1 or 2, wherein said first and second memory means are digital counters in which the position-representing information is stored in the form of binary numbers, the magnitude of which is adapted to be incremented or decremented responsively to said horizontal and vertical correction signals, respectively.

4. System according to claim 2, wherein said means for selecting a reference edge comprises means for slicing the input video signal for producing signals representing a transition in contrast caused by an edge; means including a television monitor for displaying the sliced video signal; means for producing an electronic cursor including operator-controllable means for positioning the cursor on the monitor to intersect a selected reference edge; and wherein said improvement further comprises means operative responsively to the simultaneous intersection of said cursor with a selected edge and actuation of said initializing means for storing in said memory means information representing the then position of said cursor as the initial position of a tracking window and for displaying the tracking window on said monitor.

5. System according to claim 4, wherein said last-mentioned means includes a gate circuit having at least first and second inputs and an output, means operative responsively to intersection of said cursor with a selected reference edge for producing and applying to a first input of said gate circuit a transition-indicating signal, and wherein said initializing means is operative to apply to a second input of said gate circuit a signal having characteristics such that when applied simultaneously with a transition-indicating signal a signal is produced at the output of the gate circuit for initializing storage in said memory means.

* * * * *